Jan. 6, 1925.

A. B. THOMPSON

AUTOMATIC WINDSHIELD CLEANER

Original Filed June 8, 1921

1,522,344

INVENTOR.
Arthur B. Thompson,
by Parker & Brockunn,
ATTORNEYS.

Patented Jan. 6, 1925.

1,522,344

UNITED STATES PATENT OFFICE.

ARTHUR B. THOMPSON, OF MISSOULA, MONTANA, ASSIGNOR TO JOHN R. OISHEL, OF BUFFALO, N. Y.

AUTOMATIC WINDSHIELD CLEANER.

Original application filed June 8, 1921, Serial No. 476,089. Divided and this application filed January 29, 1923. Serial No. 615,548.

*To all whom it may concern:*

Be it known that I, ARTHUR B. THOMPSON a citizen of the United States, residing at Missoula, in the county of Missoula and State of Montana, have invented a new and useful Improvement in Automatic Windshield Cleaners, of which the following is a specification.

This invention relates to automatic windshield cleaners, and is a division of my application filed June 8, 1921, Serial Number 476,089, in which is claimed the motor herein referred to, the same not being claimed per se in this application.

The objects of the invention are to provide a cleaner which is automatically operated by a source of power normally available in an automobile or other vehicle; also to provide an automatic cleaner which may effectively operate upon a relatively small amount of power; and to provide improvements in windshield cleaners in the other respects hereinafter set forth and claimed.

In the accompanying drawings I have shown my invention in the form which is now preferred by me.

Figure 1:
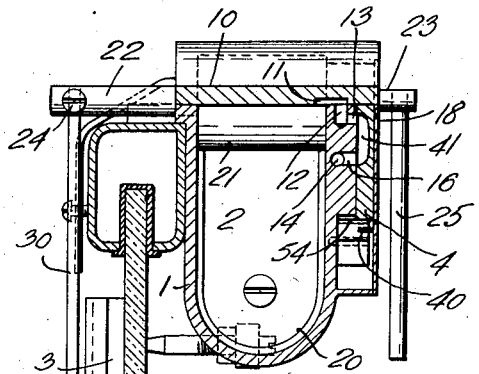
Figure 1 is a section through a windshield and portions of the operating mechanism of my wiper.
Figure 2:
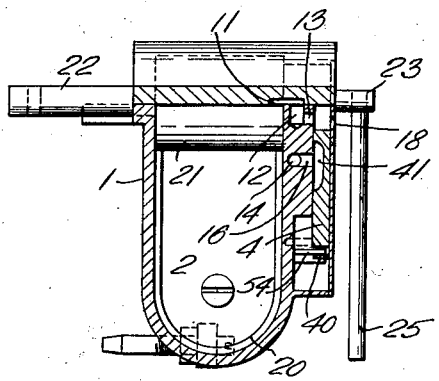
Figure 2 is a similar section through the operating mechanism, showing parts in the reversed position from that shown in Figure 1.
Figure 3:
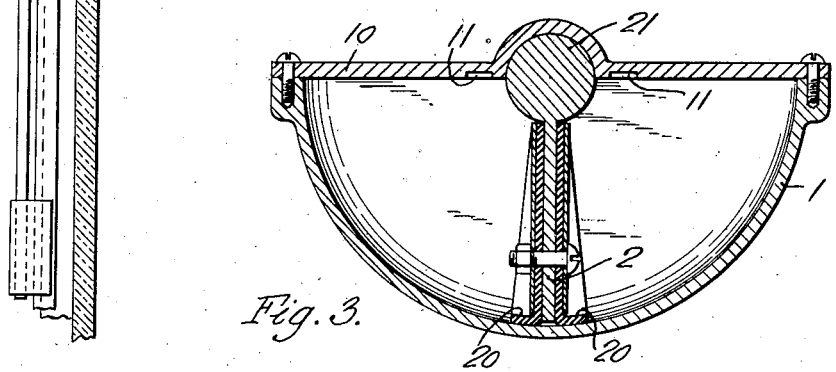
Figure 3 is a sectional view taken at right angles to Figure 1.
Figure 4:
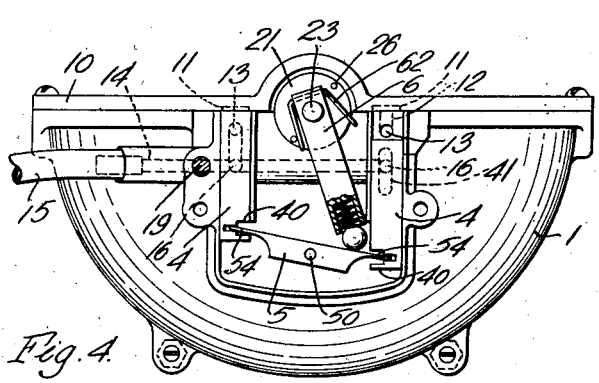
Figure 4 is an elevation of the control mechanism with a cover plate removed.

A casing or housing 1, of generally semi-circular outline, is provided with a tightly-fitting cover 10. A piston vane 2, which may be provided with flexible packing cups 20 upon opposite sides, is oscillable within the casing 1. When installed on an automobile, the power available for operation of the device varies with the speed of the engine and the piston displacement and is ofttimes very small. Therefore, to operate efficiently the windshield cleaner should be constructed to operate on relatively low pressures. To this end, the piston of the cleaner of the present invention is of the swinging vane type and is preferably directly connected to the rock shaft for operating the wiper. In the embodiment shown, the vane 2 is shown as projecting from a stub shaft 21, a reduced portion 22 of which projects from the casing. A reduced portion 23 may also project from the opposite end of the casing. The portion 22 is provided with means for the attachment of a wiper 3 of any suitable form to move the same, shown herein as having a wiper carrying or moving arm 30, the end of which passes through a suitable hole in the portion 22 and which is secured therein by means of a set screw 24. The wiper moving arm moves the wiper on the windshield glass as the piston vane is oscillated. The projecting portion 23 of the shaft 21 may have a handle 25 secured therein for hand operation of the wiper when this is desired. It will be seen that the piston 2 is or may be directly connected to the wiper moving arm which oscillates exactly as does the piston 2.

Oscillation of the piston 2 may be accomplished in any suitable manner. I prefer that this be accomplished by means of suction, that is to say atmospheric fluid pressure operating on one side of the piston having a partial vacuum produced by said suction on its other side, and have shown a conduit 15 connecting an orifice 14 of the casing 1 with a suitable suction inducing means. This might conveniently be the suction of the engine itself, in an automobile, and the conduit 15 might then be connected conveniently to the intake manifold of the engine (not shown) or to any point in the suction line between the vehicle engine and its fuel supply. For use upon street cars, where compressed air is available, the type shown in Figure 5 may be used.

Suitable means are provided for controlling the application of the suction first to one side of the piston 2 and then to its other side. I have shown the cover plate 10 as provided with a port 11 at each side of the piston which, when the cover is in place, is registerable with a port 12 having a laterally extending branch 13 extending to the outside of the casing. The conduit 15 is connected to a suction orifice or passage 14 in the casing wall, and the passage 14 has a pair of laterally exending branches 16 positioned adjacent the branches 13. Valves 4 are provided, which have passages 41 adapted, when the valve is properly positioned, to connect the passages 13 and 16. In one position of the valve these passages are connected but in the other position of the valve the passage 13 is open to the atmosphere but the passage 16 is closed off entirely. By reciprocating these valves alternately, one end of the casing 1 is connected to a suction inducing means while the other is connected to the atmosphere.

At their lower ends the valves 4 are provided with transverse slots 40. A lever 5, pivoted at 50 between its ends 54, has these ends engageable in the slots 40 of the valves 4. Tilting of the lever 5, therefore, causes the alternate and opposite actuation of the valves 4 to reverse the piston travel, as described above. As a means for tilting the lever 5, I have shown an arm 6 which may be pivoted coaxially with but which is independent of the shaft 21. I have shown the arm 6 as loosely mounted upon the reduced portion 23 of the shaft. Pins 26 secured in the shaft 21 are engageable with the arms 6 to oscillate it. Preferably the engagement of the pins 26 with the arm 6 is through the medium of a spring 62. The object of this spring is to cause the arm 6 to move positively and rapidly across the point where it is in alinement with the pivot 50 of the tiltable lever to the end that the lever will not be hung on dead-center and so cause faulty operation of the valves. The arm 6 may have at its outer end, interposed between itself and the lever 5, a spring-pressed ball 65, whereby it is in continuous yielding engagement at all times with the lever 5.

When the conduit 15 is connected to the suction inducing means the suction is communicated to the interior of the casing upon one side of the piston 2 through the passages 14, 16, 41, 13, 12 and 11. A set screw 19 in the passage 14 controls the strength of the suction. The piston moves toward this side of the casing, air being admitted behind it through the passages 13, 12 and 11, of the opposite side, this passage 13 being not covered by its valve 4. The pins 26 moving with the piston will, near the end of the piston stroke, actuate the arm 6 to move it across the pivot 50 of the tiltable lever 5. This action causes the lever 5 to tilt and reverses the position of the valves 4. This connects the suction inducing means through duplicates of the passages described above with the casing upon the opposite side of the piston 2 and connects with the atmosphere that side of the casing which was formerly in connection with the suction inducing means. The piston then swings in the reverse direction until the position of the valves is again reversed in the same manner.

Figure 5:
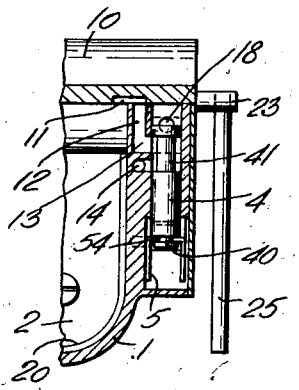
Figure 5 is a view similar to Figure 1, illustrating a modification.

In Figure 5 I have shown a construction which is intended particularly for actuation by compressed air, as upon a street car. The passage 14 is connected to a source of air under pressure. The port 13', which connects through ports 12 and 11 to the interior of the casing 1, is never open directly to the atmosphere, but is always connected with the passage 41 of the valve 4. An extra port 18, leading to the atmosphere, is so positioned that when the valve is raised as shown in dotted lines, it communicates with the valve passage 41, and, through the port 13', with the interior of the casing to exhaust the pressure therein. When the valve is lowered as shown in full lines exhaust from the casing is cut off, and air under pressure is supplied thereto. Thus the piston vane 2 is actuated by air under pressure. The words "oscillate", "oscillating", and "oscillated" are herein used to describe a swinging or vane-like movement.

I claim as my invention:

1. In a windshield cleaner, the combination of a casing, a rock shaft journalled therein, a wiper carried by said rock shaft, and a swinging operating member within said casing rigid with said shaft and adapted to receive direct applications of fluid pressure for rocking said shaft to operate said wiper.

2. In a windshield cleaner, the combination of a windshield wiper adapted to swing on an arc of a circle on a windshield glass, a fluid-actuated-operating member for said wiper mounted to swing on an arc of a circle simultaneously with said wiper and on a common pivotal axis, and a housing for said operating member having parts for attachment to a windshield frame, said housing having an external surface of arcuate outline substantially concentric with the arcs inscribed by said wiper and said operating member in their swinging movements.

3. In a windshield cleaner, the combination of a windshield-glass wiper adapted to be oscillated on a face of a windshield glass to clean the same, a rock shaft rigid with said wiper and extending angularly therefrom, a fluid-pressure-actuated operating member directly connected to said shaft, and means for applying fluid pressure directly to said operating member to cause said member to swing to oscillate said wiper.

4. In a cleaner for windshields and the like, the combination of a fluid-pressure-actuated operating member and a wiper member directly connected to swing upon a common pivotal axis, means for mounting said members on a windshield and for applying fluid pressure directly to said swinging operating member.

5. In a windshield cleaner having means for applying fluid pressure and valve mechanism including a valve actuating device for controlling said fluid pressure, the combination of a rock shaft, an oscillating windshield wiping member, and a swinging fluidpressure-actuated operating member, said wiping member, said operating member and said valve actuating device being directly mounted on said shaft to swing about a common pivotal axis.

6. In an attachable windshield cleaner, the combination with a housing having a piston chamber, of a rock shaft journalled in said housing, a wiper-carrying arm secured to one end of said shaft, an oscillatory piston rigid with said shaft and disposed within said chamber, said wiper arm, shaft and piston oscillating simultaneously in the same directions and through equal angles, and means for applying fluid pressure directly to said piston to oscillate said piston and the shaft and wiper arm.

7. In an attachable windshield cleaner, the combination with a housing having a piston chamber and inlet and outlet valve mechanism therefor, of a rock shaft journalled in said housing, a wiper-carrying arm rigid with said shaft, an oscillatory, direct fluid-actuated piston rigid with said shaft and located within said chamber, and valve mechanism actuating means rigid with said shaft, said means, piston shaft and wiper-carrying arm oscillating simultaneously in the same directions and through equal angles.

8. In a windshield cleaner of the character described, the combination of a housing having a piston chamber, of a combined rigidly associated piston and wiper-carrying arm attachable and removable from said housing as a single unit, means for rotatably mounting said unit with the piston thereof within said chamber, and means for applying fluid pressure directly to said piston to actuate said piston and the wiper carrying arm as a unit.

9. In a windshield cleaner of the character described, the combination with a housing having a journal bearing and a sector-shaped piston chamber concentric with the axis of said journal bearing, of an oscillating piston within said chamber arranged to oscillate about said axis, means for applying fluid pressure directly to said piston to oscillate it, and a wiper-carrying arm disposed outside of said housing; said wiper-carrying arm being rigid with said piston to oscillate about said axis in unison with said piston.

10. In a windshield cleaner operable on low vacuum pressures as obtained by utilizing suction from a suction passage between a vehicle engine and the fuel supply therefor, the combination with a housing having a piston chamber having an orifice for connection to such suction passage, of a rock shaft journalled in said housing, an oscillatory piston on said rock shaft and disposed within said chamber, a wiper member operatively connected to said shaft and adapted to be moved on the windshield glass by said shaft, means for automatically placing said suction passage alternately in communication with opposite sides of said piston chamber and for alternately admitting atmospheric air directly to the sides of said piston to oscillate said piston by the difference in pressure between the pressures in the connection to said suction passage and atmospheric pressure.

11. In a windshield cleaner for use on a windshield having a glass and operable on relatively low vacuum pressures as obtained by utilizing suction from a suction passage between a vehicle engine and the fuel supply therefor, the combination of a housing having means for mounting the same adjacent the windshield glass and having a piston chamber having an arcuate inner surface concentric with an axis extending substantially perpendicular to the windshield glass, a rock shaft arranged on said axis, a swinging piston carried by and adapted to actuate said rock shaft and fitting in said chamber and adapted to swing in a plane substantially parallel to the plane of the glass, a wiper member operatively connected with the shaft and adapted to be moved on the windshield glass by said shaft and in a plane at substantially right angles to said shaft, means for automatically placing said suction passage alternately in communication with opposite sides of said piston chamber and for alternately admitting atmospheric air directly to opposite sides of said piston to swing said piston by the difference in pressure between the pressures in the connection to said suction passage and atmospheric pressure.

12. In a windshield cleaner operable on relatively low pressures as obtained by utilizing suction from a suction passage between a vehicle engine and the fuel supply for the engine, the combination of a housing having a piston chamber, a swinging vane piston in said chamber adapted to receive direct applications of fluid under pressure, a wiper strip adapted to be moved on a windshield glass to clean the same, a rock shaft directly connected to said piston, and a part on said rock shaft oscillating simultaneously with said vane piston and said rock shaft for actuating said wiper strip.

ARTHUR B. THOMPSON.

Certificate of Correction.

It is hereby certified that the name of the assignee in Letters Patent No. 1,522,344, granted January 6, 1925, upon the application of Arthur B. Thompson, of Missoula, Montana, for an improvement in "Automatic Windshield Cleaners," was erroneously written and printed as "John R. Oishel" whereas said name should have been written and printed *John R. Oishei,* as shown by the records of assignments in this office; and that the said Letters Patent should be read with this correction therein that the same may conform to the record of the case in the Patent Office.

Signed and sealed this 12th day of May, A. D. 1925.

[SEAL.]

KARL FENNING,
*Acting Commissioner of Patents.*